United States Patent
Choi et al.

(10) Patent No.: US 9,614,242 B2
(45) Date of Patent: Apr. 4, 2017

(54) POLYMER ELECTROLYTE COMPOSITION, ELECTROLYTE MEMBRANE, MEMBRANE-ELECTRODE ASSEMBLY AND FUEL CELL

(71) Applicant: LG Chem, Ltd., Seoul (KR)

(72) Inventors: Seong Ho Choi, Daejeon (KR); Hye Mi Kim, Daejeon (KR); Hye Sung Cho, Daejeon (KR); Hyuk Kim, Daejeon (KR); Youngcheol Choi, Daejeon (KR); Sangwoo Lee, Daejeon (KR); Tae Geun Noh, Daejeon (KR); Kyunga Sung, Daejeon (KR); Doyoung Kim, Daejeon (KR); Minkyu Min, Incheon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/127,703

(22) PCT Filed: Mar. 15, 2013

(86) PCT No.: PCT/KR2013/002133
§ 371 (c)(1),
(2) Date: Dec. 19, 2013

(87) PCT Pub. No.: WO2013/137691
PCT Pub. Date: Sep. 19, 2013

(65) Prior Publication Data
US 2014/0363754 A1   Dec. 11, 2014

(30) Foreign Application Priority Data

Mar. 16, 2012   (KR) .................. 10-2012-0027059

(51) Int. Cl.
*H01M 8/10* (2016.01)
*H01M 8/1027* (2016.01)
(Continued)

(52) U.S. Cl.
CPC ......... *H01M 8/1027* (2013.01); *C08J 5/2268* (2013.01); *H01M 8/103* (2013.01);
(Continued)

(58) Field of Classification Search
CPC . H01M 8/1027; H01M 8/1032; H01M 8/1039
(Continued)

(56) References Cited

U.S. PATENT DOCUMENTS

| | | | |
|---|---|---|---|
| 2004/0265676 A1* | 12/2004 | Takagi et al. | 429/44 |
| 2006/0134494 A1 | 6/2006 | Shin et al. | |
| 2008/0070094 A1* | 3/2008 | Park | H01M 4/92 |
| | | | 429/480 |
| 2009/0258275 A1 | 10/2009 | Kumagai et al. | |
| 2010/0055534 A1* | 3/2010 | Tamaki et al. | 429/33 |
| 2010/0196792 A1 | 8/2010 | Yamashita | |
| 2011/0033774 A1 | 2/2011 | Yamashita | |

(Continued)

FOREIGN PATENT DOCUMENTS

| | | |
|---|---|---|
| CN | 102203159 A | 9/2011 |
| EP | 1321996 A1 | 6/2003 |
| EP | 1447816 A1 | 8/2004 |
| JP | 2004164854 A | 6/2004 |
| JP | 2006-179256 A | 7/2006 |
| JP | 2007042622 A * | 2/2007 |
| JP | 2008-106098 A | 5/2008 |
| JP | 2009206086 A | 9/2009 |
| JP | 201092839 A | 4/2010 |
| JP | 2012506941 A | 3/2012 |
| KR | 1020070095001 A | 9/2007 |

(Continued)

OTHER PUBLICATIONS

JP Office Action, Application No. 2015-500367, dated Oct. 13, 2015.

*Primary Examiner* — Jonathan Jelsma
(74) *Attorney, Agent, or Firm* — Dentons US LLP

(57) ABSTRACT

Provided are a polymer electrolyte composition, an electrolyte membrane, a membrane electrolyte assembly, and a fuel cell. The polymer electrolyte composition according to an exemplary embodiment of this application includes a first solvent, a second solvent which is different from the first solvent, and a polymer which is reacted with the first solvent and the second solvent, in which the polymer includes a functional group which reacts with the first solvent by a first reaction energy and with the second solvent by a second reaction energy, and the second reaction energy is smaller than the first reaction energy.

11 Claims, 1 Drawing Sheet

(51) Int. Cl.
*H01M 8/1032* (2016.01)
*H01M 8/1039* (2016.01)
*H01M 8/1081* (2016.01)
*H01M 8/103* (2016.01)
*H01M 8/1037* (2016.01)
*C08J 5/22* (2006.01)
*H01M 8/1018* (2016.01)

(52) U.S. Cl.
CPC ....... *H01M 8/1032* (2013.01); *H01M 8/1037* (2013.01); *H01M 8/1039* (2013.01); *H01M 8/1081* (2013.01); *C08J 2387/00* (2013.01); *H01M 2008/1095* (2013.01); *H01M 2300/0082* (2013.01); *Y02P 70/56* (2015.11)

(58) Field of Classification Search
USPC ........................................................ 429/465
See application file for complete search history.

(56) References Cited

U.S. PATENT DOCUMENTS

2011/0166241 A1  7/2011  Choi et al.
2012/0129076 A1* 5/2012  Ichimura ................ C08G 75/23
                                                        429/493

FOREIGN PATENT DOCUMENTS

KR    1020100050423 A    5/2010
KR    1020100083944 A    7/2010
KR    1020100083994 A    7/2010

* cited by examiner

POLYMER ELECTROLYTE COMPOSITION, ELECTROLYTE MEMBRANE, MEMBRANE-ELECTRODE ASSEMBLY AND FUEL CELL

CROSS-REFERENCE TO RELATED APPLICATIONS

This application is a national stage application of International Application No. PCT/KR2013/002133, filed on Mar. 15, 2013, which claims priority to and the benefit of Korean Patent Application Nos. 10-2012-0027059 filed in the Korean Intellectual Property Office on filed Mar. 16, 2012, the entire contents of which are incorporated herein by reference.

TECHNICAL FIELD

This application relates to a polymer electrolyte composition, an electrolyte membrane, a membrane electrode assembly, and a fuel cell, and more particularly, to a polymer electrolyte composition having excellent solubility characteristics with respect to the polymer, an electrolyte membrane using the same, and the like.

BACKGROUND ART

A solid polymer-type fuel cell (hereinafter referred to as a "fuel cell" in some cases) is a power-generating device that generates electricity using the chemical reaction of a fuel gas (examples thereof include hydrogen) with oxygen, and is greatly expected to play a role as one of the next-generation resources of energy in the fields of electric appliance industry, automobile industry, or the like. The fuel cell is composed of a basic unit having two catalyst layers and a polymer electrolyte membrane interposed between the two catalyst layers. When the power-generating mechanism of a fuel cell using hydrogen as a fuel gas as a typical fuel cell is briefly described, hydrogen is ionized on one catalyst layer to produce hydrogen ions, and the produced hydrogen ions are conducted (ion conduction) to the other catalyst layer through the polymer electrolyte membrane, in which the hydrogen ions are reacted with oxygen to form water. At this time, when the two catalyst layers are connected to an external circuit, an electric current flows to supply electric power to the external circuit. The ionic conduction of the polymer electrolyte membrane is produced by the movement of ions along with the movement of water through hydrophilic channels in the polymer electrolyte membrane, and thus, it has been required to maintain the polymer electrolyte membrane in the wet state in order to produce ionic conduction efficiently. Such a power-generating mechanism makes the wet state of the polymer electrolyte membrane constituting the fuel cell changed according to the starting and stopping of the fuel cells. When the wet state of the polymer electrolyte membrane is changed, the polymer electrolyte membrane is subjected to alternating between swelling and shrinkage by water absorption/drying, and thus, a defect sometimes occurs in that the interface between the polymer electrolyte membrane and the catalyst layer is microscopically damaged. In extreme cases, failure of the fuel cell may also be caused. Therefore, the polymer electrolyte membrane used in fuel cells is required to be capable of producing ionic conductivity efficiently at a low water absorption ratio as much as possible to further reduce the swelling and shrinkage (dimensional change from water absorption) according to water absorption and drying.

In the analysis, a method of preparing a polymer electrolyte membrane from a block-type copolymer polymer electrolyte using the solution cast method has been attempted.

SUMMARY OF THE INVENTION

This application has been made in an effort to improve the problem when an electrolyte membrane is prepared by the solution cast method, and in particular, to form the hydrophilic channel efficiently in the polymer electrolyte membrane by easily forming a phase separation structure resulting from repellency between the blocks having different chemical properties and controlling the phase separation structure.

Accordingly, a problem of this application is to provide a polymer electrolyte composition including a solvent capable of adjusting the solubility of a polymer.

Another problem of this application is to provide an electrolyte membrane prepared with the polymer electrolyte composition.

Yet another problem of this application is to provide a membrane electrode assembly including the electrolyte membrane.

Still another problem of this application is to provide a fuel cell including the membrane electrode assembly.

The problems to be solved by this application are not limited to the aforementioned technical problems, and other technical problems, which have not been mentioned, may be clearly understood by a person with ordinary skill in the art from the following description.

An exemplary embodiment of this application provides a polymer electrolyte composition including a first solvent, a second solvent having a chemical formula different from that of the first solvent, and a polymer which is reacted with the first solvent and the second solvent, in which the polymer includes a functional group which reacts with the first solvent by a first reaction energy and with the second solvent by a second reaction energy, and the second reaction energy is smaller than the first reaction energy.

Another exemplary embodiment of this application provides an electrolyte membrane prepared with the polymer electrolyte composition.

Yet another exemplary embodiment of this application provides a membrane electrode assembly including the electrolyte membrane.

Still another exemplary embodiment of this application provides a fuel cell including the membrane electrode assembly.

Specific details of other exemplary embodiments are included in the detailed description and drawings.

This application provides a polymer electrolyte composition having excellent solubility characteristics with respect to the polymer. Accordingly, an efficient morphology may be formed, thereby providing an electrolyte membrane having improved cation conductivity. A membrane electrode assembly and a fuel cell including the electrolyte membrane are also provided.

DETAILED DESCRIPTION

Figure 1:
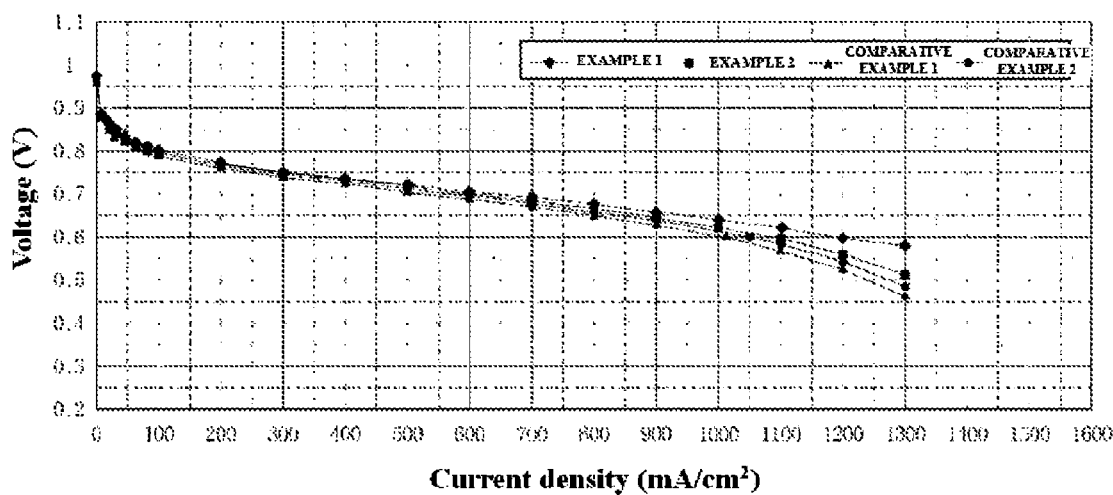
FIG. 1 illustrates data in which the performance of a fuel cell is measured at 70° C. and RH 100%.

The advantages and features of this application, and methods of accomplishing these will become obvious with reference to the exemplary embodiments to be described below in detail along with the accompanying drawings. However, this application is not limited to exemplary embodiments to be disclosed below, but various forms different from each other may be implemented. The exemplary embodiments are merely provided to make the disclosure of this application complete and to completely notify the person with ordinary skill in the art to which this application pertains, of the scope of the invention, and this application may be only defined by the scope of the claims. The size and relative size of the constituent elements marked in the drawings may be exaggerated for clarity of description.

Unless otherwise defined, all terms (including technical and scientific terms) used in the present specification may be used as the meaning which may be commonly understood by the person with ordinary skill in the art to which this application pertains. It will be further understood that terms defined in commonly used dictionaries should not be interpreted in an idealized or excessive sense unless expressly and specifically defined.

Hereinafter, the polymer electrolyte composition, polymer electrolyte membrane, membrane electrode assembly, and fuel cell according to exemplary embodiments of this application will be described with reference to FIGS. 1 and 2.

The polymer electrolyte composition according to an exemplary embodiment of this application may include a first solvent, a second solvent, and a polymer.

The polymer may be a block-type copolymer including a hydrophilic block and a hydrophobic block.

The hydrophilic block refers to a block having an ion exchange group as a functional group. Here, the functional group may be at least one selected from the group consisting of $-SO_3H$, $-SO_3^-M^+$, $-COOH$, $-COO^-M^+$, $-PO_3H_2$, $-PO_3H^-M^+$, and $-PO_3^{2-}2M^+$. Here, M may be a metallic element. That is, the functional group may be hydrophilic.

The hydrophilic block may have a weight average molecular weight from 1,000 to 500,000 (g/mol), and the hydrophobic block may have a weight average molecular weight from 1,000 to 500,000 (g/mol).

Here, the term "block having an ion exchange group" refers to a block having an average of 0.5 or more when expressed as the number of ion exchange groups per one structural unit constituting the corresponding block, and it is more preferred that the block has an average of 1.0 or more per one structural unit.

The hydrophobic block refers to the polymer block having substantially no ion exchange group.

Here, the term "block having substantially no ion exchange group" refers to a block having an average of less than 0.1 when expressed as the number of ion exchange groups per one structural unit constituting the corresponding block, a block having an average of 0.05 or less is preferred, and a block having no ion exchange group is more preferred.

Meanwhile, the term "block-type copolymer" in this application is a concept that includes copolymers in a copolymerization mode of graft polymerization, in which the block on the one side forms a main chain structure and the block on the other side forms a side chain structure, in addition to those in a copolymerization mode, in which the hydrophilic block and the hydrophobic block form a main chain structure. Meanwhile, the polymer used in this application is not limited to the above-described block-type copolymer, and a polymer including a fluorine-based element may also be used. At this time, the polymer including a fluorine-based element may also include a functional group, and the functional group may be hydrophilic. For example, the functional group may be at least one selected from the group consisting of $-SO_3H$, $-SO_3^-M^+$, $-COOH$, $-COO^-M^+$, $-PO_3H_2$, $-PO_3H^-M^+$, and $-PO_3^{2-}2M^+$. Here, M may be a metallic element.

In this application, O, N, S, Si, and H, which are denoted in Formulas, refer to oxygen, nitrogen, sulfur, silicon, and hydrogen, respectively.

The block-type copolymer polymer used in this application may be, for example, a block-type copolymer including a repeating unit represented by the following Formula 1 and a repeating unit represented by the following Formula 2, but is not limited thereto.

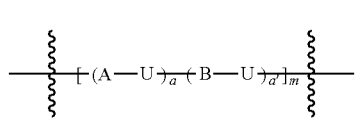

[Formula 1]

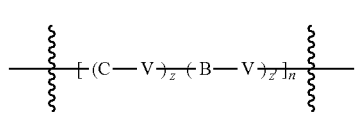

[Formula 2]

In Formulas 1 and 2, A, C, and V are the same as or different from each other and may be each independently represented by one of the following Formulas 1-1 to 1-3.

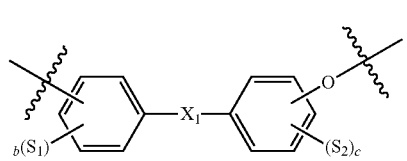

[Formula 1-1]

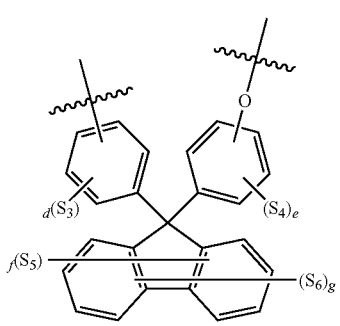

[Formula 1-2]

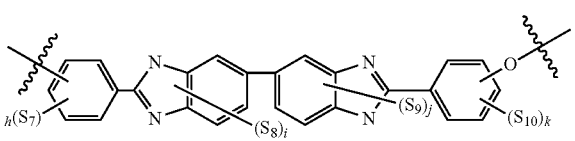

[Formula 1-3]

In Formulas 1-1 to 1-3, $X_1$ is a direct link, or one of $-C(Z_1)(Z_2)-$, $-CO-$, $-O-$, $-S-$, $-SO_2-$, and $-Si(Z_1)(Z_2)-$.

$Z_1$ and $Z_2$ are the same as or different from each other and are each independently one of hydrogen, an alkyl group, a trifluoromethyl group ($-CF_3$), and a phenyl group, $S_1$ and $S_2$ are the same as or different from each other and are each independently hydrogen; deuterium; a halogen group; a cyano group; a nitrile group; a nitro group; a hydroxyl group; a substituted or unsubstituted alkyl group;

a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, and b and c are the same as or different from each other and are each independently an integer of 0 to 4.

$S_3$ to $S_6$ are the same as or different from each other and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, and d, e, f, and g are the same as or different from each other and are each independently an integer of 0 to 4.

$S_7$ to $S_{10}$ are the same as or different from each other and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, and h, i, j, and k are the same as or different from each other and are each independently an integer of 0 to 4. Formula 1-1 may be represented by the following Formula 1-1-1.

[Formula 1-1-1]

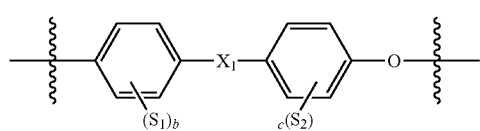

In Formula 1-1-1, $X_1$, $S_1$, $S_2$, b, and c are the same as those in Formula 1-1.

Formula 1-2 may be represented by the following Formula 1-2-1.

[Formula 1-2-1]

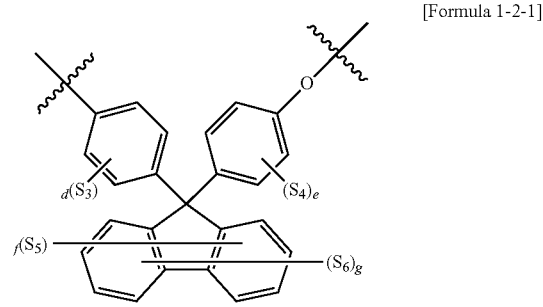

In Formula 1-2-1, $S_3$ to $S_6$, d, e, f, and g are the same as those in Formula 1-2.

Formula 1-3 may be represented by the following Formula 1-3-1.

[Formula 1-3-1]

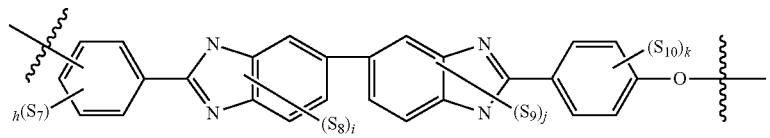

In Formula 1-3-1, $S_7$ to $S_{10}$, h, i, j, and k are the same as those in Formula 1-3.

In Formulas 1 and 2, A, C, and V are the same as or different from each other and may be at least one selected from the group consisting of

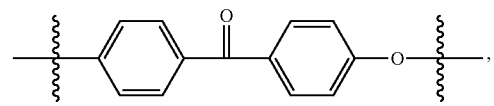

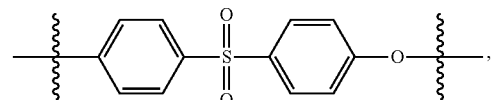

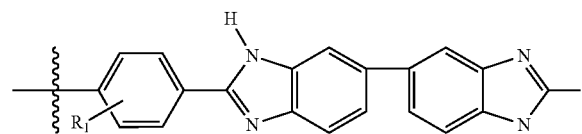

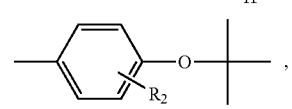

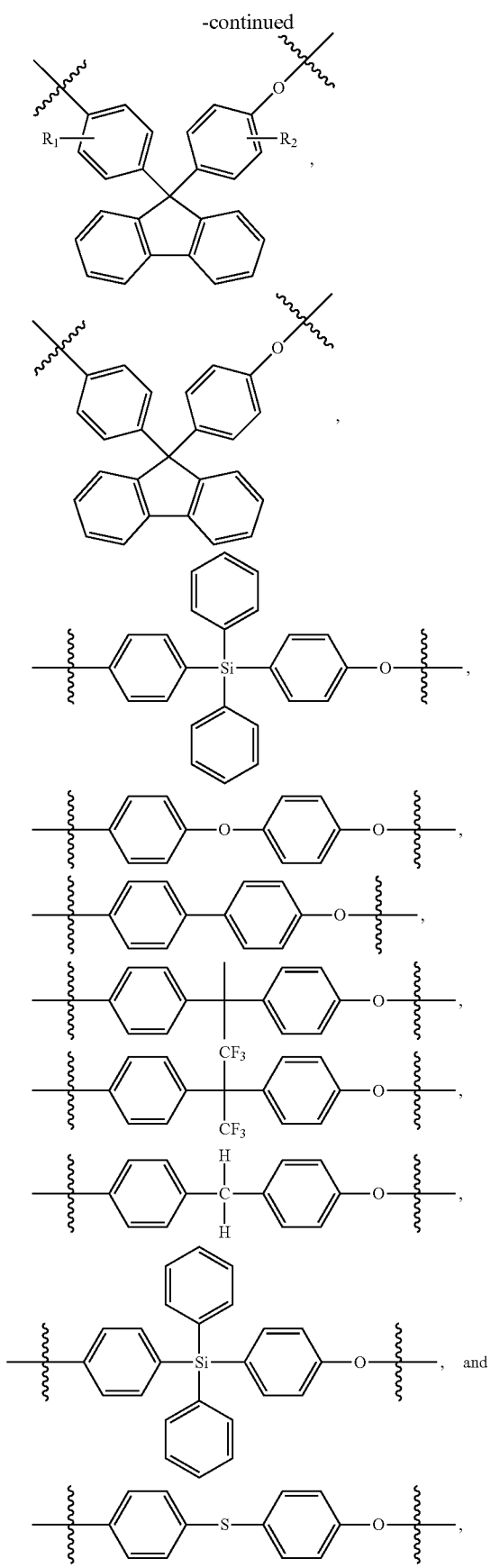

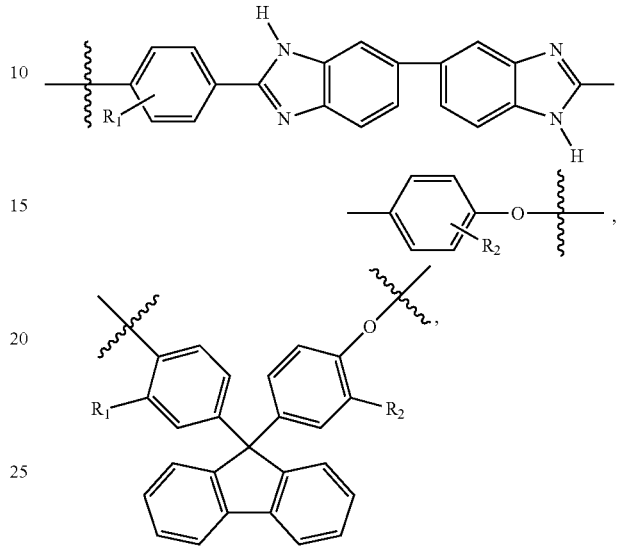

and R₁ and R₂ are the same as or different from each other and are each independently a nitro group (—NO₂) or a trifluoromethyl group (—CF₃).

In Formulas 1 and 2, A, C, and V are the same as or different from each other and may be and R₁ and R₂ are the same as or different from each other and are each independently a nitro group (—NO₂) or trifluoromethyl group (—CF₃).

In Formula 1, U may be represented by one of the following Formulas 2-1 to 2-4.

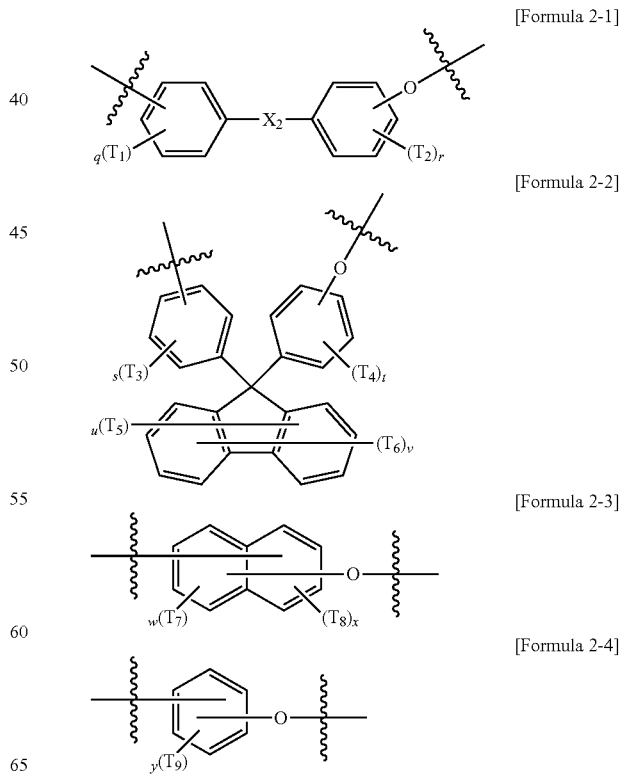

In Formulas 2-1 to 2-4, $X_2$ is a direct link, or —CO— or —SO$_2$—, q and r are the same as or different from each other and are each independently an integer of 0 to 4, s, t, u, and v are the same as or different from each other and are each independently an integer of 0 to 4, w and x are the same as or different from each other and are each independently an integer of 0 to 3, y are the same as or different from each other and are each independently an integer of 0 to 4, $T_1$ to $T_9$ are the same as or different from each other, at least one thereof are each independently —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$, M is a metallic element, and the others are the same as or different from each other and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group.

Formula 2-1 may be represented by the following Formula 2-1-1.

[Formula 2-1-1]

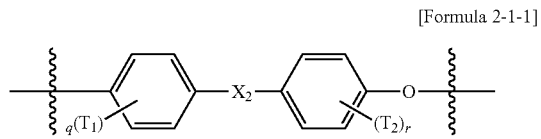

In Formula 2-1-1, $X_2$, $T_1$, $T_2$, q, and r are the same as those in Formula 2-1.

Formula 2-2 may be represented by the following Formula 2-2-1.

[Formula 2-2-1]

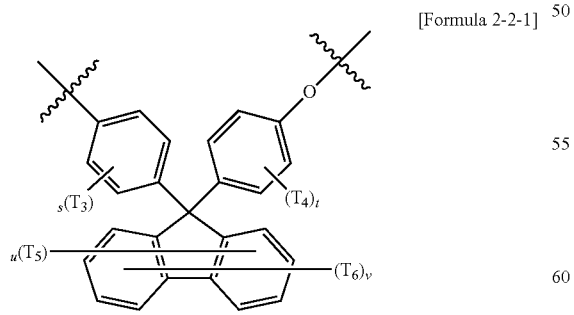

In Formula 2-2-1, $T_3$ to $T_6$, s, t, u, and v are the same as those in Formula 2-2.

Formula 2-3 may be represented by one of the following Formulas 2-3-1 to 2-3-3.

[Formula 2-3-1]

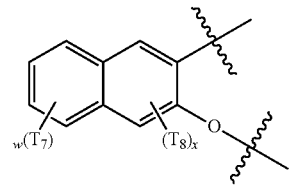

[Formula 2-3-2]

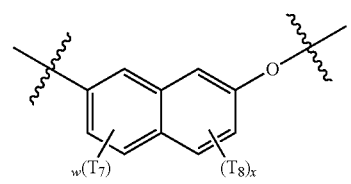

[Formula 2-3-3]

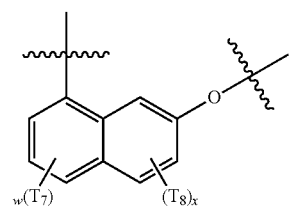

In Formulas 2-3-1 to 2-3-3, $T_7$, $T_8$, w, and x are the same as those in Formula 2-3.

[Formula 2-4-1]

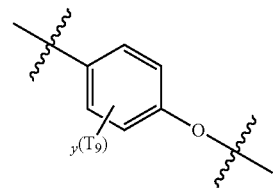

In Formula 2-4-1, $T_9$ and y are the same as those in Formula 2-4.

In Formula 1, U may be at least one selected from the group consisting of

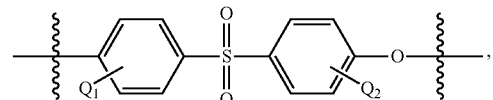

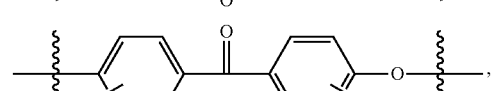

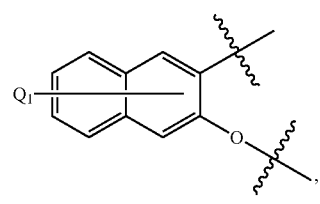

-continued

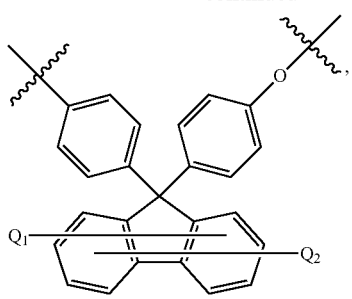

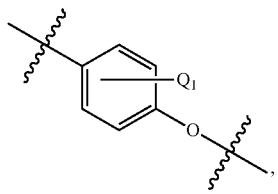

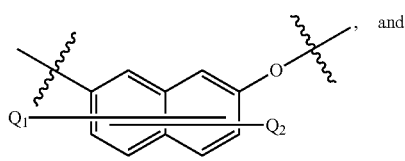, and

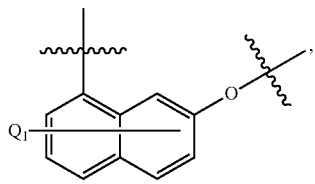

$Q_1$ and $Q_2$ are the same as or different from each other and are at least one selected from the group consisting of hydrogen, —$SO_3H$, —$SO_3^-M^+$, —COOH, —$COO^-M^+$, —$PO_3H_2$, —$PO_3H^-M^+$, and —$PO_3^{2-}2M^+$, and M is a metallic element.

In Formula 1, U may be at least one selected from the group consisting of

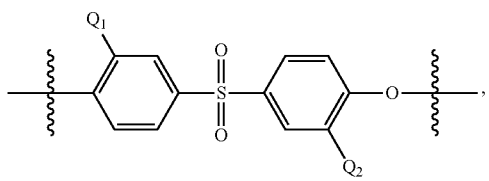

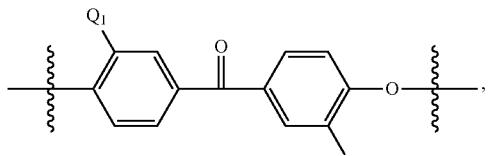

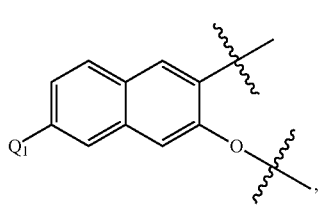

-continued

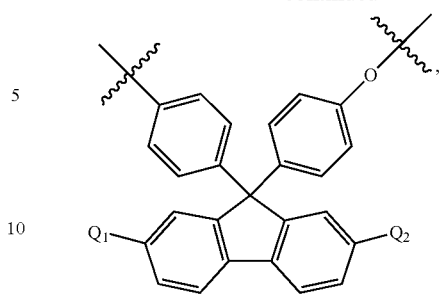

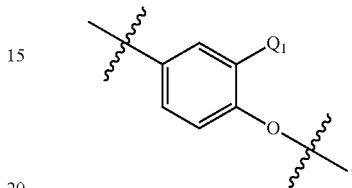

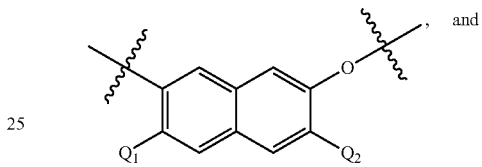, and

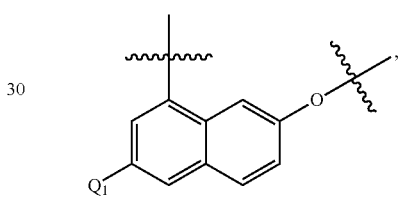

$Q_1$ and $Q_2$ are the same as or different from each other and are at least one selected from the group consisting of hydrogen, —$SO_3H$, —$SO_3^-M^+$, —COOH, —$COO^-M^+$, —$PO_3H_2$, —$PO_3^-H^-M^+$, and —$PO_3^{2-}2M^+$, and M is a metallic element.

In Formulas 1 and 2, B is an entirely fluorine-based compound or partially fluorine-based compound, or may be represented by one of the following Formulas 3-1 to 3-3.

[Formula 3-1]

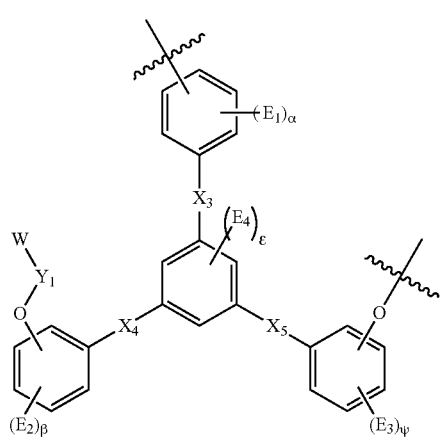

-continued

[Formula 3-2]

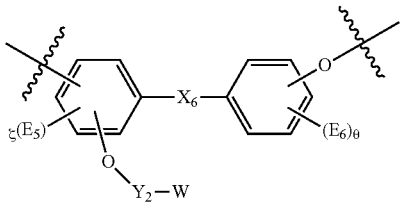

[Formula 3-3]

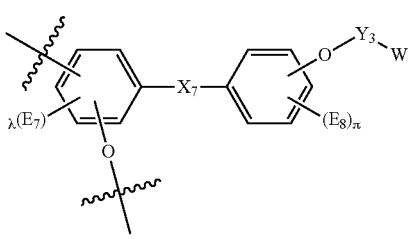

In Formulas 3-1 to 3-3, $X_3$ to $X_5$ are the same as or different from each other and are each independently a direct link, or —CO— or —SO$_2$—, $Y_1$ is a direct link, or a $C_1$ to $C_{60}$ alkylene group, $E_1$ to $E_4$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, α, β, and ψ are the same as or different from each other and are each independently an integer of 0 to 4, ε is an integer of 0 to 3, $X_6$ is a direct link, or —CO— or —SO$_2$—, $Y_2$ is a direct link, or a $C_1$ to $C_{60}$ alkylene group, $E_5$ and $E_6$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, ζ is an integer of 0 to 3, θ is an integer of 0 to 4, $X_7$ is a direct link, or —CO— or —SO$_2$—, $Y_3$ is a direct link, or a $C_1$ to $C_{60}$ alkylene group, $E_7$ and $E_8$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, λ is an integer of 0 to 3, n is an integer of 0 to 4, W is a repeating unit represented by the following [Formula 4] in Formula 1, and a repeating unit represented by the following [Formula 5] in Formula 2.

[Formula 4]

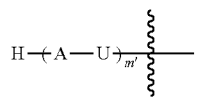

[Formula 5]

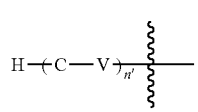

In Formula 4, m' is an integer of 1 to 10,000, and the definition of A and U is the same as that of A and U in Formula 1, and in Formula 5, n' is an integer of 1 to 100,000, and the definition of C and V is the same as that of C and V in Formula 2.

Formula 3-1 may be represented by the following Formula 3-1-1.

[Formula 3-1-1]

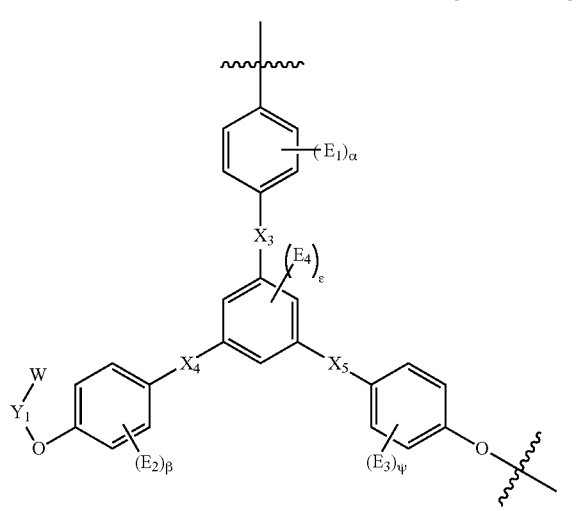

In Formula 3-1-1, $X_3$ to $X_5$, $Y_1$, $E_1$ to $E_4$, W, α, β, ψ and ε are the same as those in Formula 3-1.

Formula 3-2 may be represented by the following Formula 3-2-1.

[Formula 3-2-1]

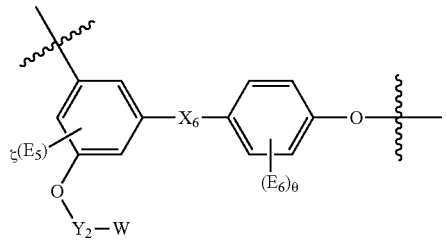

In Formula 3-2-1, $X_6$, $Y_2$, $E_5$, $E_6$, W, $\zeta$, and $\theta$ are the same as those in Formula 3-2.

Formula 3-3 may be represented by the following Formula 3-3-1.

[Formula 3-3-1]

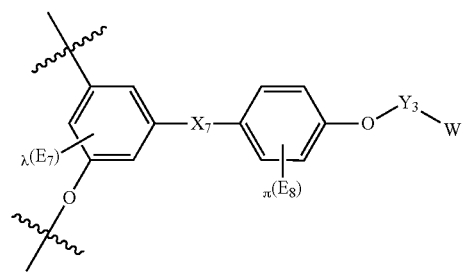

In Formula 3-3-1, $X_7$, $Y_3$, $E_7$, $E_8$, W, $\lambda$, and $\pi$ are the same as those in Formula 3-3.

In Formulas 1 and 2, B may be one selected from the group consisting of

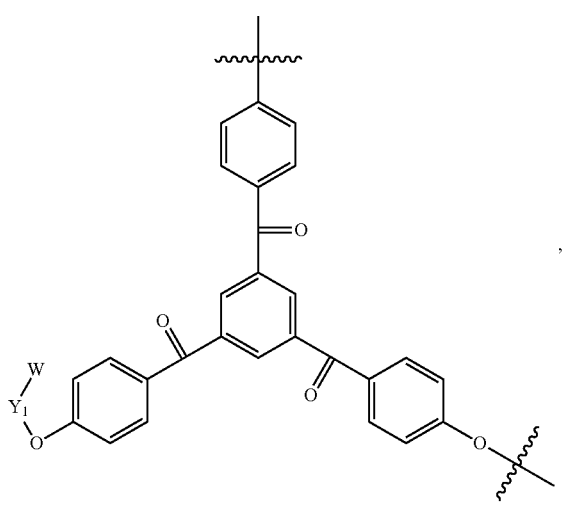

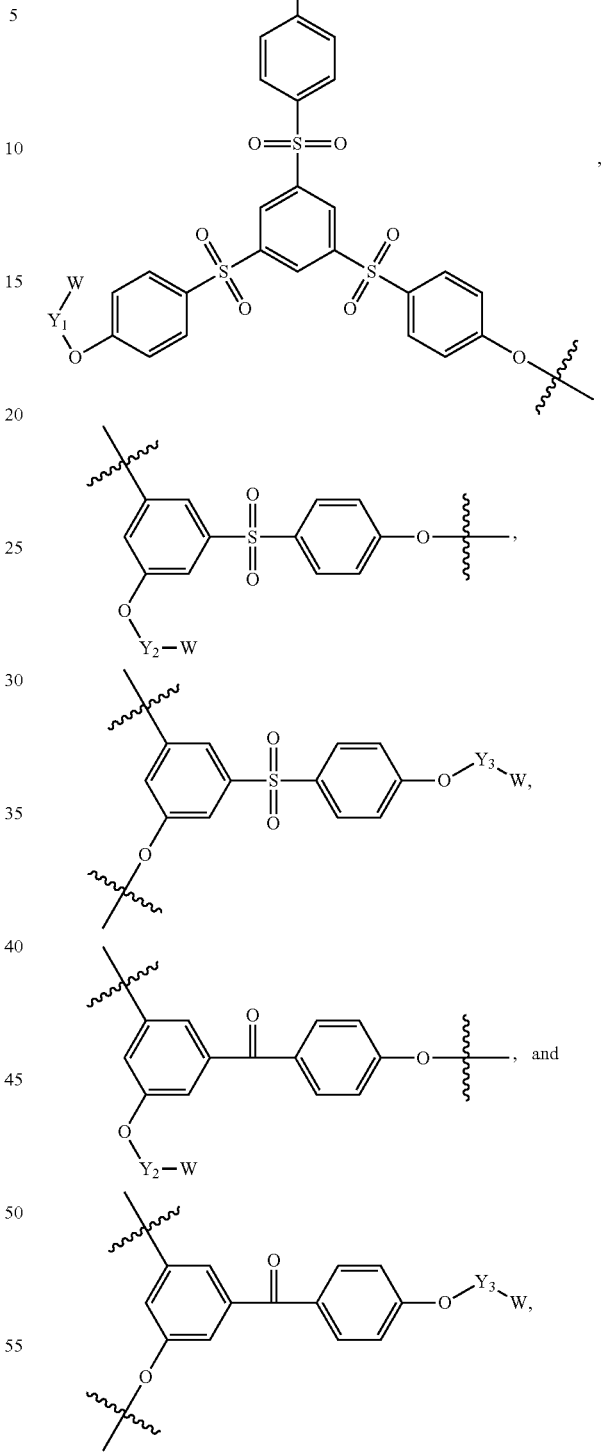

$Y_1$ to $Y_3$ are the same as or different from each other and are each independently a direct link, or a $C_1$ to $C_{60}$ alkylene group, W is a repeating unit represented by the following [Formula 4] in Formula 1, and a repeating unit represented by the following [Formula 5] in Formula 2,

[Formula 4]

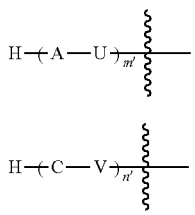

[Formula 5]

In Formula 4, m' is an integer of 1 to 10,000, and the definition of A and U is the same as that of A and U in Formula 1, and In Formula 5, n' is an integer of 1 to 100,000, and the definition of C and V is the same as that of C and V in Formula 2.

In Formula 1, a and a' are an integer larger than 0 and a:a' is 1,000:1 to 5:1, and in Formula 2, z and z' are an integer larger than 0 and z:z' is 1,000:1 to 5:1.

In Formula 1, m may be an integer of 1 to 10,000, and in Formula 2, n may be an integer of 1 to 100,000.

The block of Formula 1 and the block of Formula 2 in the block-type copolymer polymer may be arranged alternately, in a graft shape, or randomly. m may be a total sum of the numbers of repeating units of Formula 1, which are randomly arranged in the block-type copolymer polymer. n may be a total sum of the numbers of repeating units of Formula 2, which are randomly arranged in the block-type copolymer polymer.

Examples of the substituents will be described below, but are not limited thereto.

In the present specification, the aryl group may be monocyclic or polycyclic, and the number of carbon atoms is not particularly limited, but is preferably 6 to 60. Specific examples of the aryl group include a monocyclic aromatic group, such as a phenyl group, a biphenyl group, a triphenyl group, a terphenyl group, a stilbene group and the like and a polycyclic aromatic group, such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group, fluoranthene group and the like, but are not limited thereto.

In the present specification, the alkyl group may be a straight chain or branched chain, and the number of carbon atoms is not particularly limited, but is preferably 1 to 50. Specific examples thereof include a methyl group, an ethyl group, a propyl group, an isopropyl group, a butyl group, a t-butyl group, a pentyl group, a hexyl group, a heptyl group and the like, but are not limited thereto.

In the present specification, the alkenyl group may be a straight chain or branched chain, and the number of carbon atoms is not particularly limited, but is preferably 2 to 50. Specific examples thereof include an alkenyl group which is substituted with an aryl group such as a stylbenzyl group, a styrenyl group, and the like, but are not limited thereto.

In the present specification, the alkoxy group may be a straight chain or branched chain, and the number of carbon atoms is not particularly limited, but is preferably 1 to 50.

In the present specification, the cycloalkyl group is not particularly limited, but has preferably 3 to 60 carbon atoms and is particularly preferably a cyclopentyl group and a cyclohexyl group.

In the present specification, examples of the halogen group include fluorine, chlorine, bromine, or iodine.

In the present specification, the fluorenyl group has a structure in which two cyclic organic compounds are linked to each other through one atom, and examples thereof include

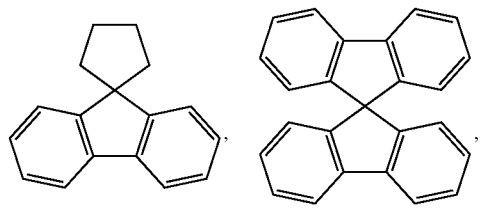

and the like.

In the present specification, the fluorenyl group includes a structure of an open fluorenyl group, and the open fluorenyl group herein has a structure in which two cyclic compounds are linked to each other through one atom and the link of one cyclic compound is broken, and examples thereof include

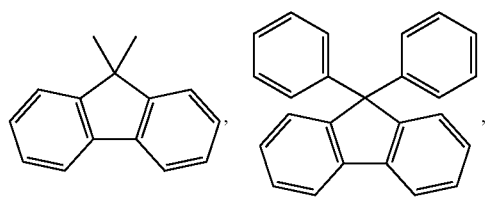

and the like.

In the present specification, the carbon number of the amine group is not particularly limited, but is preferably 1 to 50. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group, and the like, but are not limited thereto.

In the present specification, the carbon number of the arylamine group is not particularly limited, but is preferably 6 to 50. Examples of the arylamine group include a substituted or unsubstituted monocyclic diarylamine group, a substituted or unsubstituted polycyclic diarylamine group, or a substituted or unsubstituted monocyclic and polycyclic diarylamine group.

In the present specification, the term "substituted or unsubstituted" means that a group is substituted with one or more substituents selected from the group consisting of deuterium; a halogen group; an alkyl group; an alkenyl group; an alkoxy group; a cycloalkyl group; a silyl group; an arylalkenyl group; an aryl group; a boron group; an alkylamine group; an aralkylamine group; an arylamine group; a carbazole group; an arylamine group; an aryl group; a fluorenyl group; a nitrile group; a nitro group; a hydroxyl group; and a cyano group, or has no substituent.

In the present specification,

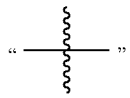

means that a group is bonded to an adjacent substituent.

In the present specification, the metallic element may be an alkali metal, an alkaline earth metal, a lanthanide group metal, an actinium group metal, a transition metal, or a post-transition metal.

The alkali metal may be Li, Na, K, Rb, Cs, or Fr. The alkaline earth metal may be Be, Mg, Ca, Sr, or Ba. The lanthanide group metal may be La, Ce, Pr, Nd, Pm, Sm, Eu, Gd, Tb, Dy, Ho, Er, Tm, Yb, and Lu.

The actinium group metal may be Ac, Th, Pa, U, Np, Pu, Am, Cm, Bk, Cf, Es, Fm, Md, No, or Lr.

The transition metal may be Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, or Cn.

The post-transition metal may be Al, Si, P, S, Ga, Ge, As, Se, In, Sn, Sb, Te, Tl, Pb, Bi, or Po.

In the present specification, the partially fluorine-based means that fluorine atoms are introduced into only a part of the side chains attached to the main chain of the polymer.

In the present specification, the entirely fluorine-based means that fluorine atoms are introduced into all of the side chains of the main chain.

For example, copolymers having a structure of $-(-CF_2-CF_2-)_n-$, such as PTFE may be classified to be entirely fluorine-based, and copolymers having a structure of $-(-CH_2-CF_2-)_n-$ such as PVDF may be classified to be partially fluorine-based. In the case of a copolymer formed of two or more polymers, when one or more polymers among polymers used in the copolymer include one or more fluorine atoms and are used in the copolymer simultaneously with polymers which do not include one or more fluorine atoms, the copolymer may be classified to be partially fluorine-based.

The block-type copolymer may be at least one selected from the group consisting of polystyrene (PS); polyisoprene (PI); polyalkylene; polyalkyleneoxide; polyalkyl(meth) acrylate; poly(2-vinylpyridine) (P2VP); poly(4-vinylpyridine) (P4VP)); poly(meth)acrylic acid (PAA); polyalkyl (meth)acrylic acid; polydialkylsiloxane; polyacrylamide (PAM); poly(ε-caprolactone) (PCL); polylactic acid (PLA); and poly(lactic-co-glycolic acid) (PLGA) (meaning an alkylene or alkyl having 1 to 20 carbon atoms).

The first solvent is not particularly limited as long as the solvent may be a material which is reacted with a polymer to dissolve the polymer. The first solvent serves as a main solvent in the polymer electrolyte composition according to an exemplary embodiment of this application.

For example, the first solvent may be at least one selected from the group consisting of N,N'-dimethylacetamide (DMAc), N-methylpyrrolidone (NMP), dimethyl sulfoxide (DMSO), and N,N-dimethylformamide (DMF), but is not limited thereto.

The second solvent has a chemical formula different from the first solvent, and in particular, may be reacted with one or more hydrophilic functional groups of the polymer to dissolve the polymer. The second solvent may help the first solvent to dissolve the polymer. For example, the second solvent may be water or glycerol, and is not limited thereto as long as the second solvent is a material having a hydroxyl group.

Within the polymer electrolyte composition of this application, when the weight ratio of the first solvent and the second solvent is represented by the second solvent/the first solvent, the range thereof is preferably 1/99 to 10/90, and more preferably 3/97 to 8/92.

When the value of the second solvent/the first solvent is less than 1/99, even though the second solvent is added, it may be difficult to expect an increase in solubility of the polymer by the second solvent. Meanwhile, when the value of the second solvent/the first solvent exceeds 10/90, the amount of the first solvent, which is a main solvent, is so small that the polymer may not be completely dissolved, and thus, it may be difficult to make the polymer electrolyte composition be solubilized. Accordingly, it may be difficult to form an electrolyte membrane by the cast method. That is, the composition needs to be coated uniformly on the substrate in order to form an electrolyte membrane by the cast method, but when the polymer electrolyte composition is not made to be solubilized, the composition may not be uniformly coated, and thus, a non-uniform electrolyte membrane may be formed.

Meanwhile, the hydrophilic functional group of the polymer may be reacted with the first solvent with the first reaction energy, and may be reacted with the second solvent with the second reaction energy. In this application, the reaction energy refers to a stabilization energy between a reference monomer and the solvent. More specifically, the reaction energy refers to the difference between the energy value when the reference monomer and the solvent are each present and the energy value when the monomer is reacted with the solvent to be stabilized.

For example, it is assumed that the polymer is a block-type copolymer having a hydrophilic block and a hydrophobic block, the first solvent is dimethyl sulfoxide (DMSO), and the second solvent is water. At this time, it is assumed that the hydrophilic block of the polymer includes, for example, a sulfonic acid group of $-SO_3K$.

Referring to the following Table 1 showing the reaction energy of the monomer including the sulfonic acid group of $-SO_3K$ and the solvent, dimethyl sulfoxide as the first solvent is reacted with the monomer including the sulfonic acid group of $-SO_3K$ which is included in the hydrophilic block of the polymer with the first reaction energy of −5.6 kcal/mol to be stabilized. Meanwhile, water as the second solvent is reacted with the second reaction energy of −6.3 kcal/mol to be stabilized. That is, it can be known that the reaction energy (the second reaction energy) between the second solvent and the functional group of the polymer (the sulfonic acid group of $-SO_3K$) is smaller than the reaction energy (the first reaction energy) between the first solvent and the functional group of the polymer (the sulfonic acid group of $-SO_3K$). Accordingly, the second solvent may be reacted with the functional group of the polymer more easily than the first solvent, and the second solvent may be reacted with the functional group to form a complex. Accordingly, the polymer electrolyte composition of this application may include a complex obtained by reacting the hydrophilic block with the second solvent.

TABLE 1

| Solvent | Reaction energy (kcal/mol) | Structure |
| --- | --- | --- |
| Dimethyl sulfoxide | −5.6 | 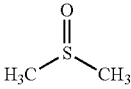 |
| Water | −6.3 |  |
| Methanol | −6.4 | H₃C—OH |
| Ethylene glycol | −9.3 |  |
| Glycerol | −6.7 | 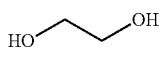 |

The reaction energy value of Table 1 was calculated by using the chemical calculation function of the program Gaussian 09 manufactured by Gaussian, Inc.

That is, the sulfonic acid group of —SO₃K may be reacted with water to form a sulfonic acid-water complex. When the second solvent is glycerol, a sulfonic acid-glycerol complex may be formed.

Meanwhile, when the polymer is a block-type copolymer including the hydrophilic block and the hydrophobic block, the hydrophobic block in the first solvent may have a first variable ($\delta 1$). A complex formed by reacting the functional group of the hydrophilic block with the second solvent may also have a second variable ($\delta 2$) in the first solvent.

In relation to the degree of aggregation between constituent elements of the material, the variable $\delta$ shows the measure of the degree of aggregation between constituent elements of the material, and may be represented by the following Equation 1.

$$\delta = \text{(self-mixing energy of the solute)} - \text{(salvation energy of the solvent)} - \Delta G_{fus} \quad \text{[Equation 1]}$$

In Equation 1, $\Delta G_{fus}$ is the standard Gibbs free energy of fusion of the solute, and the units of self-mixing energy of the monomer, salvation energy of the solvent, and $\Delta G_{fus}$ are kcal/mol.

The self-mixing energy of the solute is a chemical potential value when the solute is present while being mixed in the liquid phase in the solvent (the same as the solute).

The smaller the value of the self-mixing energy of the solute is, the more stable the solute is. The salvation energy of the solvent is a chemical potential value when the solute is present while being mixed in the liquid phase in the solvent (a material which is different from the solute, or a mixture of two or more including the material of the solute).

The smaller the value of the salvation energy of the solvent is, the more stable the solvent is.

$\Delta G_{fus}$ (standard Gibbs free energy of fusion) of the solute is a value of energy needed when the solute in the solid state is melted at a temperature of 25° C.

When $\Delta G_{fus}$ of the solute has a positive value, the mixture of the solvent and the solute is an endothermic reaction, and when $\Delta G_{fus}$ has a negative value, the mixture of the solvent and the solute is an exothermic reaction.

The variable $\delta$ is a value represented by a difference between the values of self-mixing energy of the solute in consideration of standard Gibbs free energy of fusion and salvation energy of the solvent, and the larger the value of the variable $\delta$ is, the better the solute is dissolved in the selected solvent.

The self-mixing energy of the solute, the salvation energy of the solute, and $\Delta G_{fus}$ may be measured experimentally by the energy difference before and after the mixture, or calculated using a computer program capable of predicting a thermodynamic model.

Meanwhile, from the viewpoint of the variable $\delta$, the polymer electrolyte composition according to exemplary embodiments of this application may have the condition of the following Equation 2.

$$\delta 2 - \delta 1 > 0 \quad \text{[Equation 2]}$$

The variable $\delta 1$ is a calculated value in Equation 1, in which the solute is a monomer constituting the hydrophobic block and the solvent is the first solvent, and the variable $\delta 2$ is a calculated value in Equation 1, in which the solute is a hydrophilic block complex obtained by reacting the functional group of the hydrophilic block with the second solvent and the solvent is the first solvent.

When the hydrophobic block, the hydrophilic block, the first solvent, and the second solvent satisfy the condition of Equation 2, which is calculated by Equation 1, the hydrophilic block complex which has been reacted with the second solvent may be dissolved in the first solvent more efficiently than the hydrophobic block. That is, when the second variable ($\delta 2$) of the hydrophilic block complex is larger than the first variable ($\delta 1$) of the hydrophobic block of the polymer, the polymer, which is dissolved in the first solvent and the second solvent, may be more completely dissolved. That is, the second solvent is reacted with the hydrophilic block better than the first solvent, and the first solvent dissolves the hydrophilic block better than the hydrophobic block.

The hydrophilic block having the functional group has lower solubility in the first solvent than the hydrophobic block, and thus may be less dissolved in the first solvent. Whereby, it may be difficult to make the composition be solubilized. This application may entirely improve the solubility of the polymer dissolved in the first solvent by additionally using the second solvent which reacts with the functional group of the hydrophilic block to form a complex having a solubility in the first solvent, which is relatively higher than that of the hydrophobic block. Accordingly, the solubility of the polymer dissolved in the solvent may be improved by using a complex heterogeneous solvent consisting of the first solvent and the second solvent.

Meanwhile, an electrolyte membrane may be formed by using the polymer electrolyte composition of this application. The electrolyte membrane may be formed by the cast method.

The solution cast method is a method of film-forming a polymer electrolyte membrane on a supporting substrate by cast-coating (casting film-formation) the polymer electrolyte composition of this application on a supporting substrate, such as a glass substrate, a polyethylene terephthalate (PET) film, and the like to form a coating film, and removing volatile components, such as solvents and the like from the coating film. The polymer electrolyte membrane may be obtained by removing the supporting substrate by peeling-off and the like.

Meanwhile, a membrane electrode assembly (MEA) may be formed by using the polymer electrolyte composition of this application to prepare an electrolyte membrane, and using the electrolyte membrane.

The membrane electrode assembly (MEA) includes: a cathode; an anode; and an electrolyte membrane disposed between the cathode and the anode, and the electrolyte membrane is the above-mentioned electrolyte membrane according to this application.

The membrane electrode assembly (MEA) refers to an assembly of electrodes (cathode and anode) in which an electrochemical catalyst reaction of fuel and air occurs, and a polymer membrane in which the transfer of hydrogen ions occurs, and is a single integration-type unit in which the electrodes (cathode and anode) are adhered to the electrolyte membrane.

The membrane electrode assembly of this application is a form to bring a catalyst layer of the anode and a catalyst layer of the cathode into contact with the electrolyte membrane, and may be prepared by a typical method known in the art. As an example, the membrane electrode assembly may be prepared by performing thermocompression at 100° C. to 400° C. while the cathode; the anode; and the electrolyte membrane disposed between the cathode and the anode are closely adhered to each other.

This application provides a fuel cell including the membrane electrode assembly (MEA). The fuel cell may be prepared by a typical method known in the art, using the membrane electrode assembly (MEA) of this application. For example, the fuel cell may be prepared to be configured by the membrane electrode assembly (MEA) prepared above and a bipolar plate.

The fuel cell of the present invention includes a stack, a fuel supply unit, and an oxidant supply unit.

The stack includes one or two or more membrane electrode assemblies of the present invention, and a bipolar plate interposed between two or more membrane electrode assemblies when the two or more membrane electrode assemblies are included. The bipolar plate serves to transfer the fuel and oxidant supplied from the outside to the membrane electrode assembly, and as a conductor that connects the anode with the cathode in series.

The fuel supply unit serves to supply fuel to the stack, and may be composed of a fuel tank for storing fuel and a pump for supplying the fuel stored in the fuel tank to the stack. Hydrogen or a hydrocarbon fuel in the gas or liquid state may be used as the fuel, and examples of the hydrocarbon fuel include methanol, ethanol, propanol, butanol, or natural gas, but are not limited thereto.

The oxidant supply unit serves to supply an oxidant to the stack.

Air is typically used as the oxidant, and oxygen or air may be used while being injected by a pump.

It is possible to use a polymer electrolyte fuel cell, a direct liquid fuel cell, a direct methanol fuel cell, a direct formic acid fuel cell, a direct ethanol fuel cell, a direct dimethyl ether fuel cell, and the like as the fuel cell.

Hereinafter, this application will be described in detail through the Examples. However, the following Examples are only for illustrating this application, and this application is not limited by the following Examples.

Example 1

Preparation Example 1. Formation of Hydrocarbon-Based Sulfonated Block-Type Copolymer Hydroquinonesulfonic acid potassium salt (0.9 eq.), 4,4'-difluorobenzophenone (0.97 eq.), and 3,5-bis(4-fluorobenzoyl)phenyl(4-fluorophenyl)methanone (0.02 eq.) were put into a 1 L-round bottom flask equipped with a Dean-Stark trap and a condenser, and the mixture was prepared in a nitrogen atmosphere using potassium carbonate as a catalyst in dimethyl sulfoxide (DMSO) and a benzene solvent. Next, the reaction mixture was stirred in an oil bath at a temperature of 140° C. for 4 hours to adsorb an azeotropic mixture to the molecular sieves of the Dean-Stark trap and then remove the mixture while benzene was flowing backward, and then the reaction temperature was increased to 180° C., and a condensation polymerization reaction was allowed to occur for 20 hours. After the reaction was completed, the temperature of the reactant was decreased to 60° C., and then 4,4'-difluorobenzophenone (0.2275 eq.), 9,9-bis(hydroxyphenyl)fluorine (0.335 eq.), and 5-bis(4-fluorobenzoyl)phenyl(4-fluorophenyl)methanone (0.005 eq.) were put into the same flask, and the reaction was resumed by using potassium carbonate as a catalyst in a nitrogen atmosphere using DMSO and benzene. Next, the reaction mixture was again stirred in an oil bath at a temperature of 140° C. for 4 hours to adsorb the azeotropic mixture to the molecular sieves of the Dean-Stark trap and then remove the mixture while benzene was flowing backward, and then the reaction temperature was increased to 180° C., and a polycondensation reaction was allowed to occur for 20 hours. Next, the temperature of the reactant was decreased to room temperature, DMSO was further added thereto to dilute the product, and then the diluted product was poured into an excess of methanol to separate the copolymer from the solvent. Thereafter, an excess of potassium carbonate was removed by using water, and then the copolymer obtained through filtration was dried in a vacuum oven at 80° C. for 12 hours or more to prepare a branched sulfonated multi block-type copolymer in which hydrophobic blocks and hydrophilic blocks are alternately linked by a chemical bond with each other.

Preparation Example 2. Preparation of Polymer Electrolyte Composition 38 g of dimethyl sulfoxide as the first solvent and 2 g of water as the second solvent were prepared, mixed, and stirred for 2 hours to prepare a heterogeneous solvent. Subsequently, 10 g of the hydrocarbon-based sulfonated block-type copolymer prepared in Preparation Example 1 was dissolved in the heterogeneous solvent, filtered with a BORU glass filter (pore size 3) to remove dirt and the like, and then a polymer electrolyte composition solution was prepared.

Preparation Example 3. Preparation of Electrolyte Membrane

The solution prepared in Preparation Example 2 was used to cast a polymer film on a substrate using a doctor blade on a horizontal plate of a film applicator in a clean bench, and then the film was maintained at a temperature of 50° C. for 2 hours to be subjected to a soft bake. Thereafter, the film was placed in an oven set at 100° C. and dried for 24 hours to form an electrolyte membrane including the polymer electrolyte composition prepared in Preparation Example 2.

Preparation Example 4. Preparation of Membrane Electrode Assembly

A membrane electrode assembly was prepared according to the known preparation process using the electrolyte membrane of Preparation Example 3, and the prepared membrane electrode assembly was applied to a hydrogen fuel cell and a direct methanol fuel cell.

Example 2

A hydrocarbon-based sulfonated block-type copolymer, a polymer electrolyte composition, a membrane electrode assembly, and a fuel cell were prepared by using the same materials and methods as in Example 1, except that glycerol was prepared as the second solvent.

Comparative Example 1

A hydrocarbon-based sulfonated block-type copolymer, a polymer electrolyte composition, a membrane electrode assembly, and a fuel cell were prepared by using the same materials and methods as in Example 1, except that methanol was prepared as the second solvent.

Comparative Example 2

A hydrocarbon-based sulfonated block-type copolymer, a polymer electrolyte composition, a membrane electrode assembly, and a fuel cell were prepared by using the same materials and methods as in Example 1, except that ethylene glycol was prepared as the second solvent.

Experimental Example 1

The first variable ($\delta 1$) and the second variable ($\delta 2$) of the polymer electrolyte compositions prepared in Examples 1 and 2, and Comparative Examples 1 and 2 were calculated by Equation 1, when the self-mixing energy of the solute, the salvation energy of the solvent, and $\Delta G_{fus}$ were calculated by using the program COSMOtherm manufactured by COSMOlogic, Inc. The first variable ($\delta 1$) is a calculated value in Equation 1 when the solvent is dimethyl sulfoxide and the solute is a monomer of the hydrophobic block of the sulfonated multi block-type copolymer, and the second variable ($\delta 2$) is a resulting value in Equation 1 when the solvent is dimethyl sulfoxide and the solute is a hydrophilic block complex obtained by reacting the hydrophilic functional group of the sulfonated multi block-type copolymer with the second solvent (Example 1: water, Example 2: glycerol, Comparative Example 1: methanol, and Comparative Example 2: ethylene glycol).

The measured first variable ($\delta 1$), the second variable ($\delta 2$), and the resulting value according to Equation 2 are shown in Table 2.

The resulting values in the following Table 2 were calculated by using the program COSMOtherm.

TABLE 2

| | First variable ($\delta 1$) | Second variable ($\delta 2$) | Value of $\delta 2 - \delta 1$ |
|---|---|---|---|
| Example 1 | 3.35 | 3.99 | 0.64 |
| Example 2 | 3.35 | 4.20 | 0.85 |
| Comparative Example 1 | 3.35 | 2.86 | −0.48 |
| Comparative Example 2 | 3.35 | 3.01 | −0.34 |

As can be known from the result, it can be known that the values of $\delta 2-\delta 1$ in Examples 1 and 2 are all larger than 0, and the values of $\delta 2-\delta 1$ in Comparative Examples 1 and 2 are all smaller than 0. That is, when the second solvent was mixed with the first solvent, it can be known that Examples 1 and 2 had a result that the solubility of the hydrophilic block complex, which was reacted with the second solvent, in the first solvent was increased more than the solubility of the hydrophobic block in the first solvent, while Comparative Examples 1 and 2 failed to have the result. Accordingly, it can be known that in the hydrocarbon-based sulfonated block-type copolymer, the hydrophilic block complex has a relatively better solubility in the solvents in Examples 1 and 2 rather than Comparative Examples 1 and 2 than the hydrophobic block.

Experimental Example 2

The performances of the fuel cells including the electrolyte membranes prepared in Examples 1 and 2 and Comparative Examples 1 and 2 were evaluated. FIG. 1 illustrates data in which the performance of the fuel cell is measured at 70° C. and RH 100%, and FIG. 2 illustrates data in which the performance of the fuel cell is measured at 70° C. and RH 50%.

Referring to FIG. 1, it can be known that at 0.6 V, Examples 1 and 2 show a current density of approximately 1,200 mA/cm$^2$ and a current density of approximately 1,100 mA/cm$^2$, respectively. Conversely, it can be known that at 0.6 V, Comparative Examples 1 and 2 show a current density of approximately 1,020 mA/cm$^2$ and a current density of approximately 1,050 mA/cm$^2$, respectively.

Figure 2:
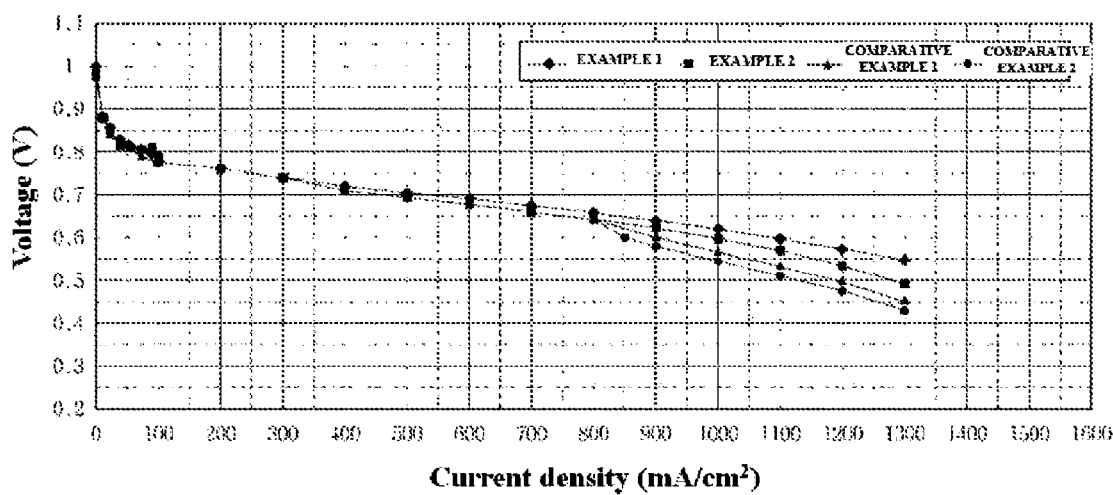
FIG. 2 illustrates data in which the performance of a fuel cell is measured at 70° C. and RH 50%.

Referring to FIG. 2, it can be known that at 0.6 V, Examples 1 and 2 show a current density of approximately 1,100 mA/cm$^2$ and a current density of 1,000 mA/cm$^2$, respectively. Conversely, it can be known that at 0.6 V, Comparative Examples 1 and 2 show a current density of approximately 900 mA/cm$^2$ and a current density of approximately 850 mA/cm$^2$, respectively. That is, it can be known that the fuel cell including the electrolyte membrane prepared by using the polymer electrolyte composition of this application has excellent performance.

The exemplary embodiments of this application have been described with reference to the accompanying drawings, but this application is not limited to the exemplary embodiments and may be prepared in various forms, and it will be understood by a person with ordinary skill in the art, to which this application pertains, that the exemplary embodiments of this application may be implemented in other specific forms without modifying the technical spirit or essential feature of this application. Thus, it is to be appreciated that the exemplary embodiments described above are intended to be illustrative in every sense, and not restrictive.

What is claimed is:
1. An electrolyte composition comprising:
a polymer comprising a block-type copolymer,
the block-type copolymer comprising a hydrophilic block and a hydrophobic block, the hydrophilic block comprising a sulfonic acid group;
a first solvent;
a second solvent, wherein the second solvent is water;
wherein the electrolyte composition further comprises a sulfonic acid-water complex formed by reacting the second solvent with the hydrophilic block sulfonic acid group, the complex having a higher solubility than the hydrophobic block with respect to the first solvent, and
wherein the block-type copolymer comprises a repeating unit represented by the following Formula 1 and a repeating unit represented by the following Formula 2:

[Formula 1]

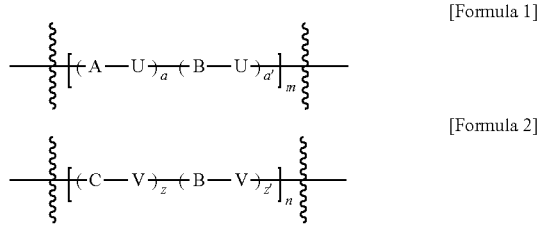

[Formula 2]

in Formula 1, a and a' each separately is an integer larger than 0 and a:a' is 1,000:1 to 5:1, and m is an integer from 1 to 10,000, and in Formulas 1 and 2, A, C, and V are the same as or different from each other, and each independently represented by one of the following Formulas 1-1 to 1-3,

[Formula 1-1]

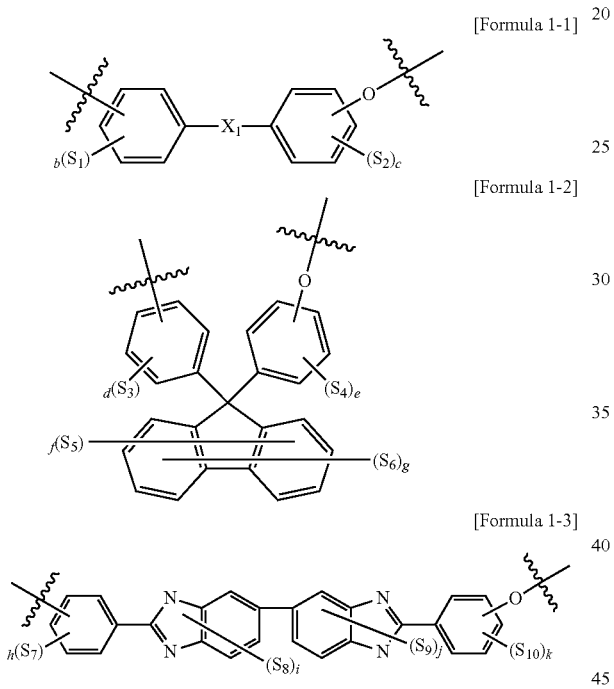

[Formula 1-2]

[Formula 1-3]

in Formulas 1-1 to 1-3, $X_1$ is a direct link, or one of $-C(Z_1)(Z_2)-$, $-CO-$, $-O-$, $-S-$, $-SO_2-$, and $-Si(Z_1)(Z_2)-$, $Z_1$ and $Z_2$ are the same as or different from each other, and are each independently one of hydrogen, an alkyl group, a trifluoromethyl group ($-CF_3$), and a phenyl group, $S_1$ and $S_2$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, b and c are the same as or different from each other, and are each independently an integer of 0 to 4, $S_3$ to $S_6$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, d, e, f, and g are the same as or different from each other, and are each independently an integer of 0 to 4, $S_7$ to $S_{10}$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, and h, i, j, and k are the same as or different from each other, and are each independently an integer of 0 to 4, in Formula 2, z and z' are an integer larger than 0 and z:z' is 1,000:1 to 5:1, n is an integer from 1 to 100,000, and U is represented by one of the following Formulas 2-1 to 2-4,

[Formula 2-1]

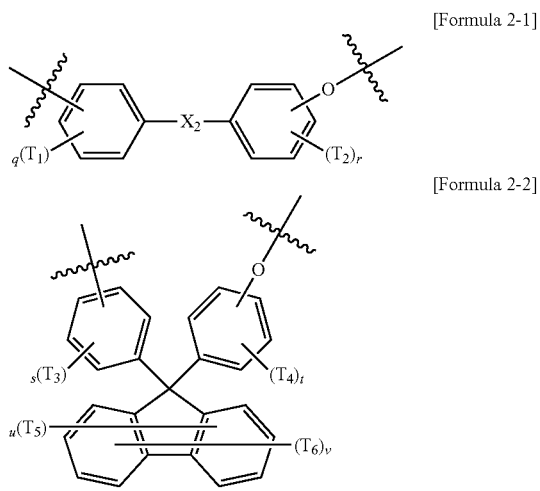

[Formula 2-2]

[Formula 2-3]

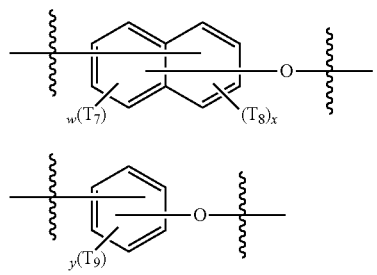

[Formula 2-4]

in Formulas 2-1 to 2-4, $X_2$ is a direct link, or —CO— or —SO$_2$—, q and r are the same as or different from each other and are each independently an integer of 0 to 4, s, t, u, and v are the same as or different from each other and are each independently an integer of 0 to 4, w and x are the same as or different from each other and are each independently an integer of 0 to 3, y is an integer of 0 to 4, $T_1$ to $T_9$ are the same as or different from each other, at least one of $T_1$ to $T_9$ in Formulas 2-1 to 2-4 is a —SO$_3$H or —SO$_3^-$M$^+$ and the other are each independently —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$, M is a metallic element, and the others are hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, in Formulas 1 and 2, B is represented by one of the following Formulas 3-1 to 3-3,

[Formula 3-1]

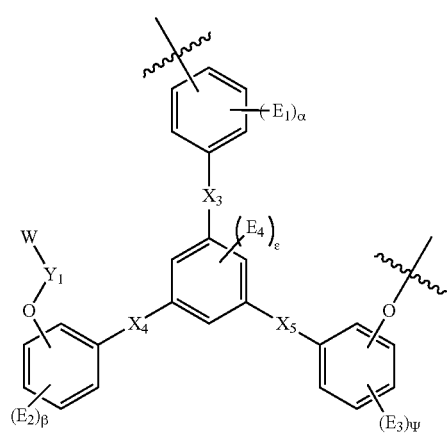

[Formula 3-2]

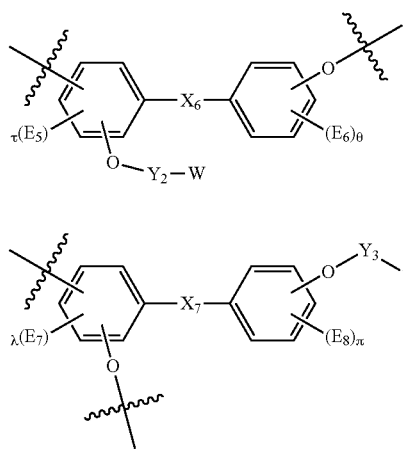

[Formula 3-3]

in Formulas 3-1 to 3-3, $X_3$ to $X_5$ are the same as or different from each other and are each independently a direct link, or —CO— or —SO$_2$—, $Y_1$ is a direct link, or a $C_1$ to $C_{60}$ alkylene group, $E_1$ to $E_4$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, α, β, and ψ are the same as or different from each other and are each independently an integer of 0 to 4, ε is an integer of 0 to 3, $X_6$ is a direct link, or —CO— or —SO—, $Y_2$ is a direct link, or a $C_1$ to $C_{60}$ alkylene group, $E_5$ and $E_6$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, ζ is an integer of 0 to 3, θ is an integer of 0 to 4, $X_7$ is a direct link, or —CO— or —SO$_2$—, $Y_3$ is a direct link, or a $C_1$ to $C_{60}$ alkylene group, $E_7$ and $E_8$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, λ an integer of 0 to 3, π is an integer of 0 to 4, and W is a repeating unit represented by the following [Formula 4] in Formula 1, and a repeating unit represented by the following [Formula 5] in Formula 2,

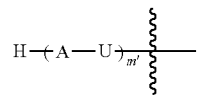

[Formula 4]

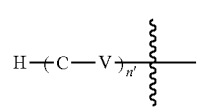

[Formula 5]

in Formula 4, m' is an integer of 1 to 10,000, and a definition of A and U is the same as that of A and U in Formula 1, and in Formula 5, n' is an integer of 1 to 100,000, and a definition of C and V is the same as that of C and V in Formula 2.

2. The composition of claim 1, wherein the first solvent is at least one selected from the group consisting of N,N'-dimethylacetamide (DMAc), N-methyl pyrrolidone (NMP), dimethyl sulfoxide (DMSO), and N,N-dimethylformamide (DMF).

3. The composition of claim 1, wherein A, C, and V are the same as or different from each other and are at least one selected from the group consisting of

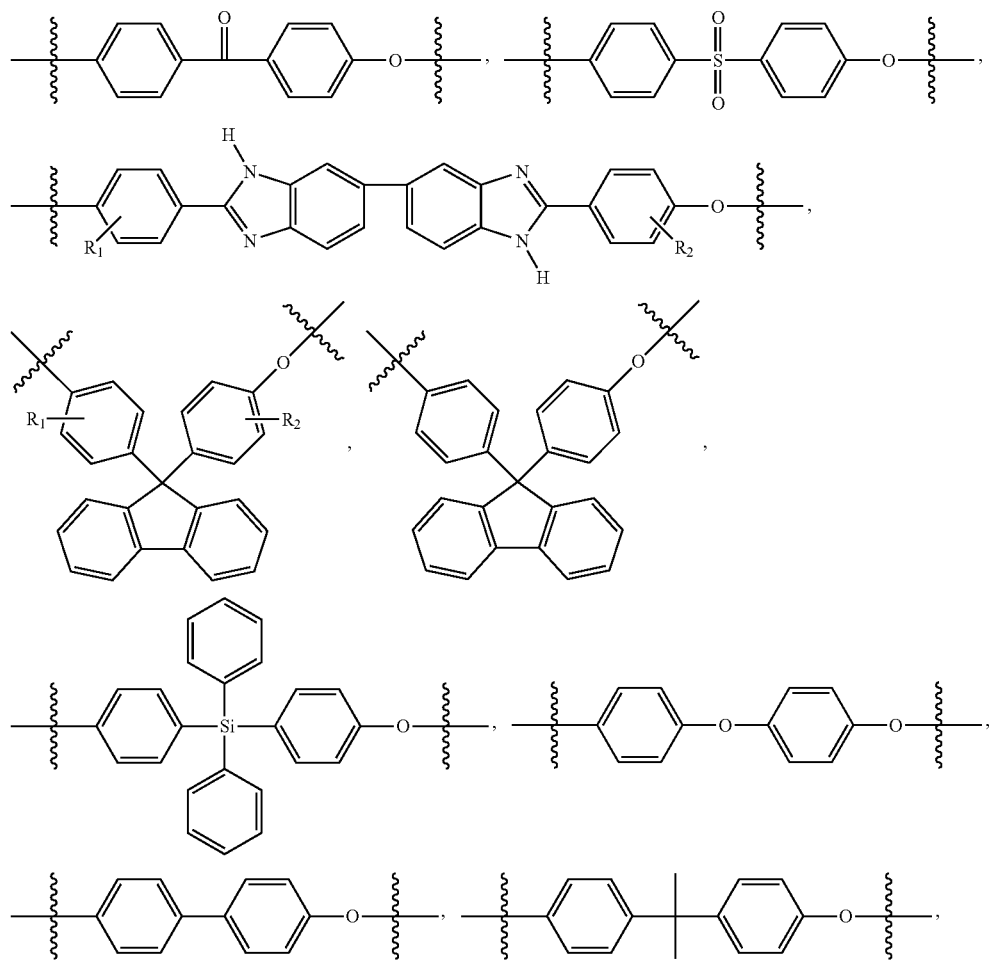

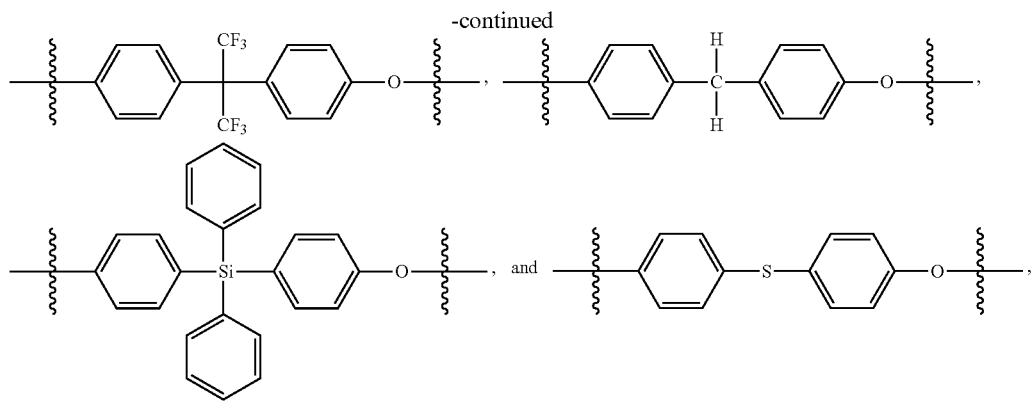

and

R$_1$ and R$_2$ are the same as or different from each other and are each independently a nitro group (—NO$_2$) or a trifluoromethyl group (—CF$_3$).

4. The composition of claim 1, wherein U is at least one selected from the group consisting of

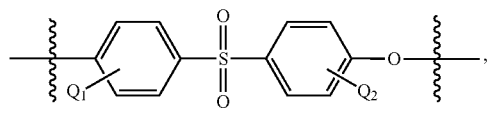

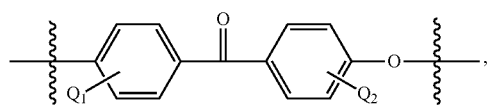

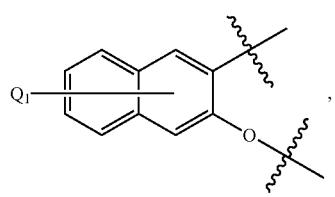

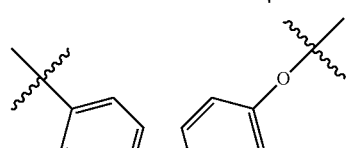

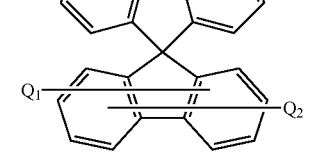

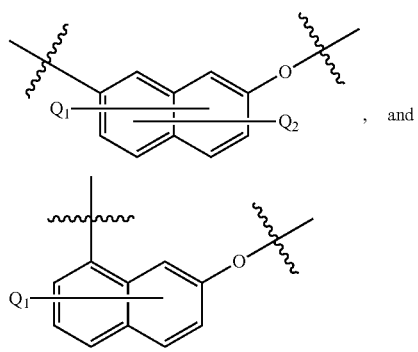

Q$_1$ and Q$_2$ are the same as or different from each other and at least one of Q$_1$ and Q$_2$ is a —SO$_3$H or —SO$_3^-$M$^+$ and the other is —SO$_3$H, —SO$_3^-$M$^+$, —COOH, —COO$^-$M$^+$, —PO$_3$H$_2$, —PO$_3$H$^-$M$^+$, or —PO$_3{}^{2-}$2M$^+$, and M is a metallic element.

5. The composition of claim 1, wherein B is one selected from the group consisting of

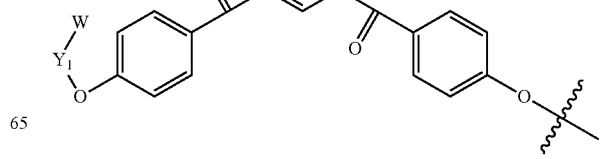

-continued

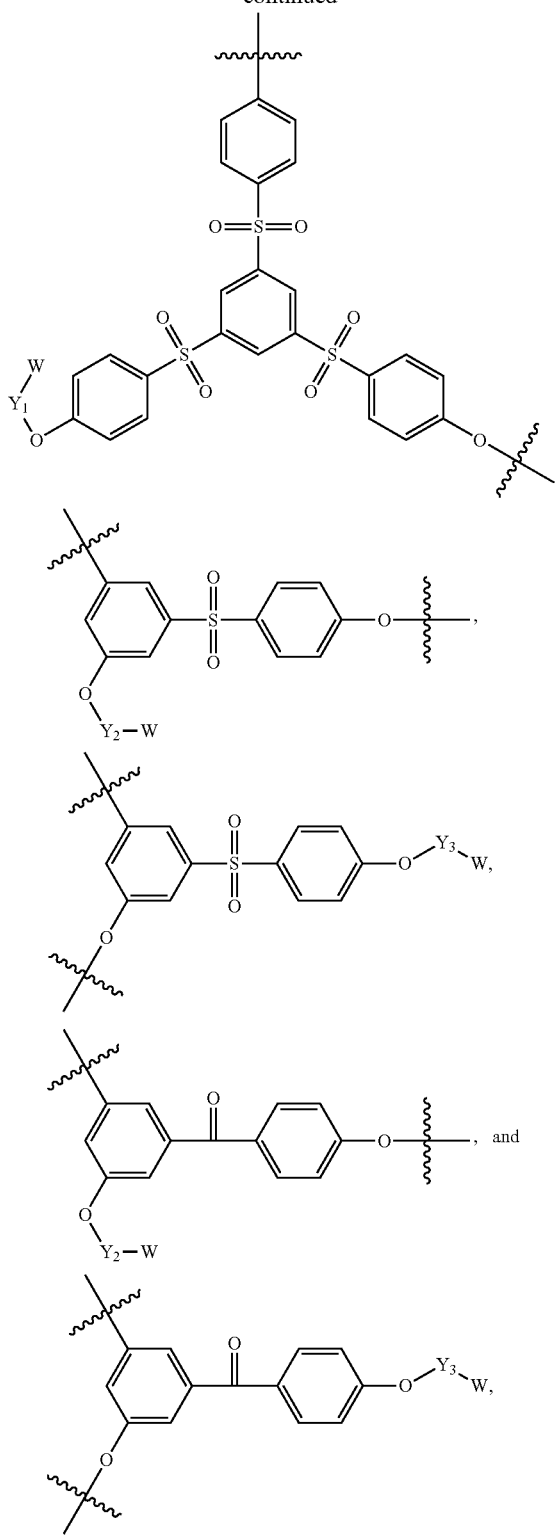

$Y_1$ to $Y_3$ are the same as or different from each other and are each independently a direct link, or a $C_1$ to $C_{60}$ alkylene group, and W is a repeating unit represented by the following [Formula 4] in Formula 1, and a repeating unit represented by the following [Formula 5] in Formula 2,

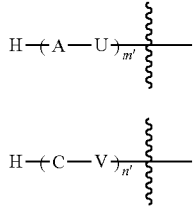

[Formula 4]

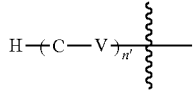

[Formula 5]

in Formula 4, m' is an integer of 1 to 10,000, and a definition of A and U is the same as that of A and U in Formula 1, and in Formula 5, n' is an integer of 1 to 100,000, and a definition of C and V is the same as that of C and V in Formula 2.

6. The composition of claim 1, wherein the sulfonic acid group is $SO_3K$.

7. The composition of claim 1, wherein the weight ratio of the second solvent to the first solvent 3/97 to 8/92.

8. An electrolyte membrane formed of the polymer electrolyte composition of claim 1.

9. A membrane electrode assembly comprising:
a cathode;
an anode; and
an electrolyte membrane disposed between the cathode and the anode,
wherein the electrolyte membrane is the electrolyte membrane of claim 8.

10. A polymer electrolyte-type fuel cell comprising:
a stack comprising one or two or more membrane electrode assemblies of claim 9 and a bipolar plate interposed between the membrane electrode assemblies;
a fuel supply unit for supplying fuel to the stack; and
an oxidant supply unit for supplying an oxidant to the stack.

11. An electrolyte composition comprising:
a polymer comprising a block-type copolymer;
the block-type copolymer comprising a hydrophilic block and a hydrophobic block, the hydrophilic block comprising a sulfonic acid group,
wherein the hydrophilic block has a weight average molecular weight from 1,000 to 500,000 (g/mol), and the hydrophobic block has a weight average molecular weight from 1,000 to 500,000 (g/mol);
a first solvent;
a second solvent, wherein the second solvent is water;
wherein a weight ratio of the second solvent to the first solvent 1/99 to 10/90,
wherein the electrolyte composition further comprises a sulfonic acid-water complex formed by reacting the second solvent with the hydrophilic block sulfonic acid group, the complex having a higher solubility than the hydrophobic block with respect to the first solvent, and
wherein the block-type copolymer comprises a repeating unit represented by the following Formula 1 and a repeating unit represented by the following Formula 2:

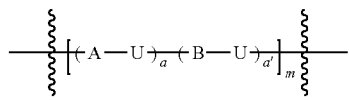

[Formula 1]

[Formula 2]

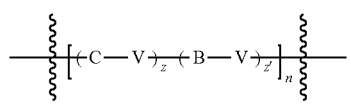

in Formula 1, a and a' each separately is an integer larger than 0 and a:a' is 1,000:1 to 5:1, and m is an integer from 1 to 10,000, and in Formulas 1 and 2, A, C, and V are the same as or different from each other, and each independently represented by one of the following Formulas 1-1 to 1-3,

[Formula 1-1]

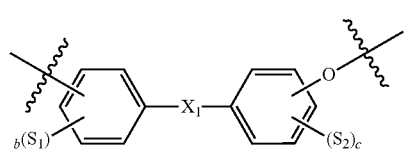

[Formula 1-2]

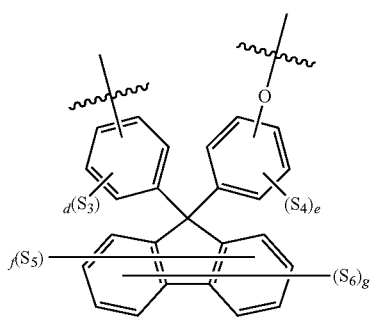

[Formula 1-3]

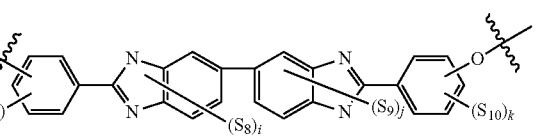

in Formulas 1-1 to 1-3, $X_1$ is a direct link, or one of $-C(Z_1)(Z_2)-$, $-CO-$, $-O-$, $-S-$, $-SO_2-$, and $-Si(Z_1)(Z_2)-$, $Z_1$ and $Z_2$ are the same as or different from each other, and are each independently one of hydrogen, an alkyl group, a trifluoromethyl group ($-CF_3$), and a phenyl group, $S_1$ and $S_2$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, b and c are the same as or different from each other, and are each independently an integer of 0 to 4, $S_3$ to $S_6$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, d, e, f, and g are the same as or different from each other, and are each independently an integer of 0 to 4, $S_7$ to $S_{10}$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, and h, i, j, and k are the same as or different from each other, and are each independently an integer of 0 to 4, in Formula 2, z and z' are an integer larger than 0 and z:z' is 1,000:1 to 5:1, n is an integer from 1 to 100,000, and U is represented by one of the following Formulas 2-1 to 2-4,

[Formula 2-1]

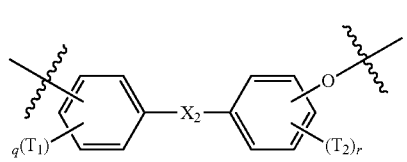

[Formula 2-2]

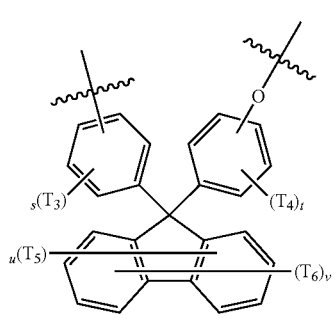

[Formula 2-3]

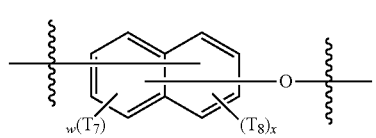

[Formula 2-4]

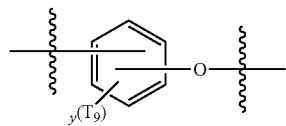

in Formulas 2-1 to 2-4, $X_2$ is a direct link, or —CO— or —SO$_2$—, q and r are the same as or different from each other and are each independently an integer of 0 to 4, s, t, u, and v are the same as or different from each other and are each independently an integer of 0 to 4, w and x are the same as or different from each other and are each independently an integer of 0 to 3, y is an integer of 0 to 4, $T_1$ to $T_9$ are the same as or different from each other, at least one of $T_1$ to $T_9$ in Formulas 2-1 to 2-4 is a —SO$_3$H or —SO$_3^-$M$^+$ and the other are each independently —SO$_3$H, —SO$_3^-$M$^+$, —COOH, —COO$^-$M$^+$, —PO$_3$H$_2$, —PO$_3$H$^-$M$^+$, or —PO$_3^{2-}$2M$^+$, M is a metallic element, and the others are hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, in Formulas 1 and 2, B is represented by one of the following Formulas 3-1 to 3-3,

[Formula 3-1]

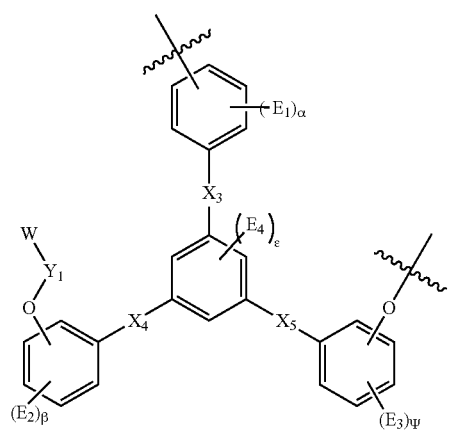

[Formula 3-2]

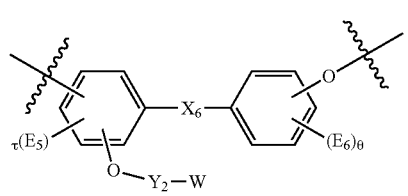

[Formula 3-3]

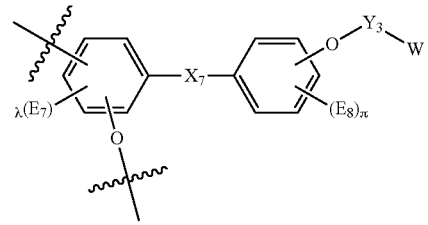

in Formulas 3-1 to 3-3, $X_3$ to $X_5$ are the same as or different from each other and are each independently a direct link, or —CO— or —SO$_2$—, $Y_1$ is a direct link, or a $C_1$ to $C_{60}$ alkylene group, $E_1$ to $E_4$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, α, β, and ψ are the same as or different from each other and are each independently an integer of 0 to 4, ε is an integer of 0 to 3, $X_6$ is a direct link, or —CO— or —SO—, $Y_2$ is a direct link, or a Ci to $C_{60}$ alkylene group, $E_5$ and $E_6$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, ζ is an integer of 0 to 3, θ is an integer of 0 to 4, $X_7$ is a direct link, or —CO— or —SO$_2^-$, $Y_3$ is a direct link, or a $C_1$ to $C_{60}$ alkylene group, $E_7$ and $E_8$ are the same as or different from each other, and are each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; a substituted or unsubstituted fluorenyl group; or a substituted or unsubstituted carbazole group, λ an integer of 0 to 3, π is an integer of 0 to 4, and W is a repeating unit represented by the following [Formula 4] in Formula 1, and a repeating unit represented by the following [Formula 5] in Formula 2,

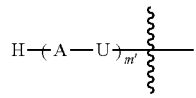

[Formula 4]

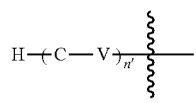

[Formula 5]

in Formula 4, m' is an integer of I to 10,000, and a definition of A and U is the same as that of A and U in Formula 1, and in Formula 5, n' is an integer of 1 to 100,000, and a definition of C and V is the same as that of C and V in Formula 2.

\* \* \* \* \*